G. R. BAKER.
DIRIGIBLE LAMP FOR VEHICLES.
APPLICATION FILED APR. 11, 1914.
1,110,177.
Patented Sept. 8, 1914.
2 SHEETS—SHEET 1.
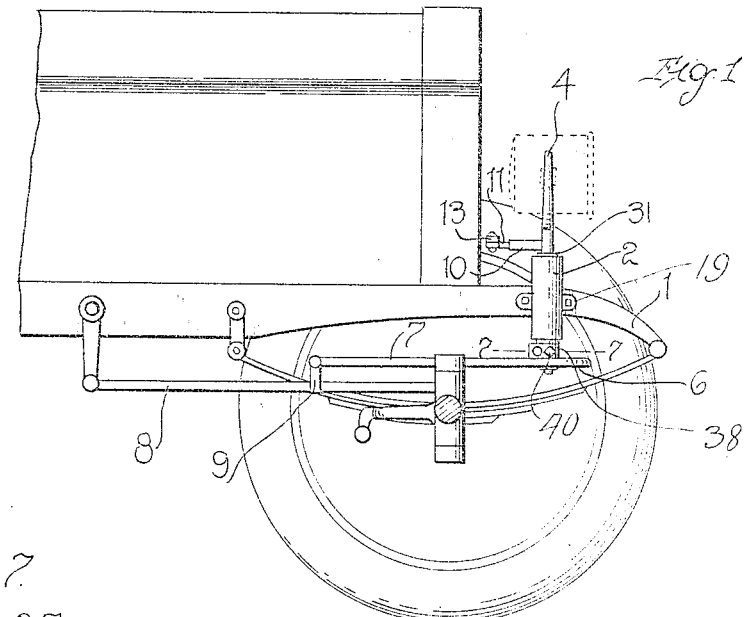
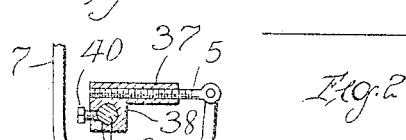
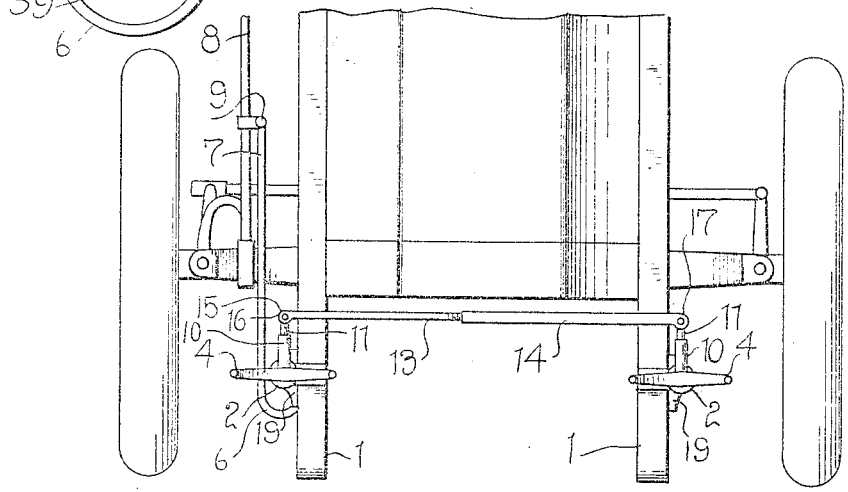
Witnesses
Robert M. Sutphen
A. I. Hirt
Inventor
G. R. BAKER
By Watson E. Coleman
Attorney G. R. BAKER.
DIRIGIBLE LAMP FOR VEHICLES.
APPLICATION FILED APR. 11, 1914.
1,110,177.
Patented Sept. 8, 1914.
2 SHEETS—SHEET 2.
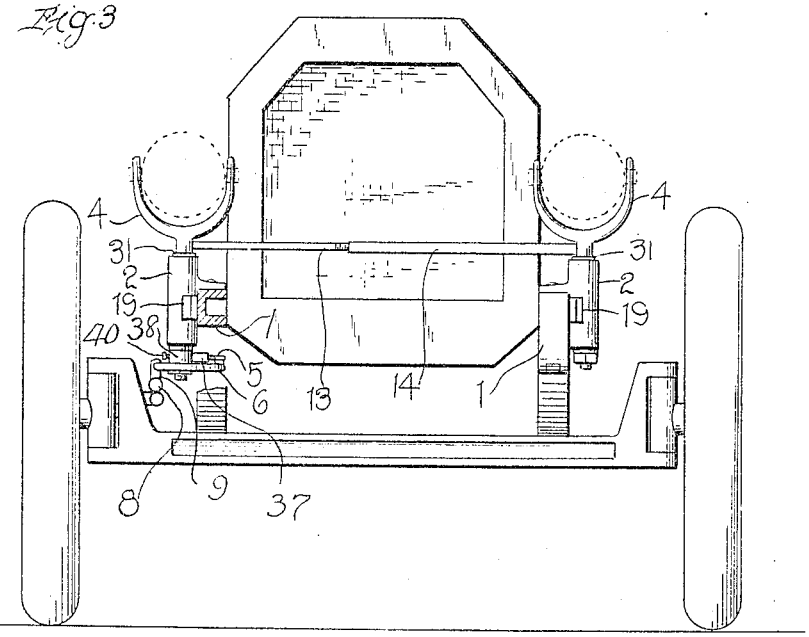
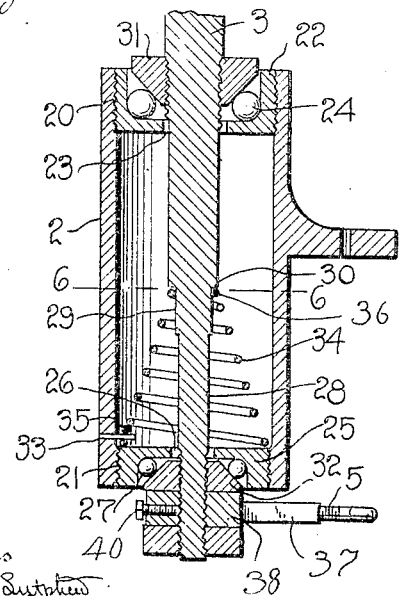
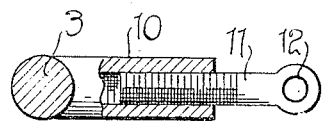
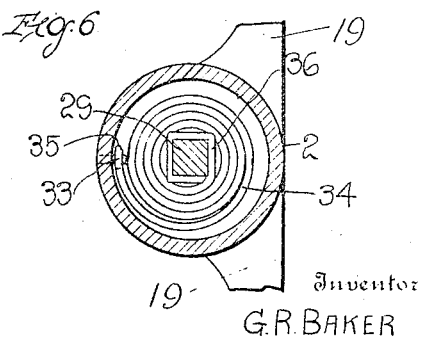
Inventor
G. R. BAKER

UNITED STATES PATENT OFFICE.

GEORGE R. BAKER, OF VERNON, TEXAS.

DIRIGIBLE LAMP FOR VEHICLES.

1,110,177.

Specification of Letters Patent.

Patented Sept. 8, 1914.

Application filed April 11, 1914. Serial No. 831,205.

*To all whom it may concern:*

Be it known that I, GEORGE R. BAKER, a citizen of the United States, residing at Vernon, in the county of Wilbarger and State of Texas, have invented certain new and useful Improvements in Dirigible Lamps for Vehicles, of which the following is a specification, reference being had to the accompanying drawings.

This invention relates to improvements in vehicle attachments, and relates more particularly to devices for turning the head lamps of an automobile or similar vehicle either to the right or to the left, simultaneously with the turning of the steering wheels thereof, so that the beams of light will be thrown directly in the path of the vehicle when the same is turning, as well as when the vehicle is following a straight course.

An object of this invention is the provision of an attachment for vehicles which is adjustable so as to be easily attached to different makes of automobiles or other vehicles, and one which is simple in construction, and durable in use.

Another object of the invention is the provision of a device of this character which is directly connected to the steering gear of the vehicle so that when the steering gear is operated to turn the wheels, the lamps are also turned.

With these and other objects in view, the invention consists in the novel construction, arrangement and combination of parts to be hereinafter more fully described, claimed, and illustrated in the accompanying drawings, in which—

Figure 1 is a side elevation of the forward end of a vehicle, showing my improved mechanism connected thereto; Fig. 2 is a top plan view thereof; Fig. 3 is a front elevation thereof; Fig. 4 is a vertical sectional view of one of the sockets; Fig. 5 is a fragmentary section showing means for connecting one end of the connecting rod to one of the lamp posts; Fig. 6 is a section on the line 6—6 of Fig. 4; and Fig. 7 is a sectional view on the line 7—7 of Fig. 1.

Referring more particularly to the drawing, the numeral 1 designates the forward ends of the bed rails of the vehicle, and secured to the outer face of each rail adjacent its forward end is a socket 2, each of the sockets 2 being adapted to receive the post of a lamp bracket 4. The lower ends of the posts 3 project below the lower ends of the boxes 2, and connected to the lower extremity of one of the posts is a horizontally disposed threaded rod 5 which normally extends inwardly of the vehicle, and connected to the extremity of the rod 5 is the hooked end 6 of a connecting rod 7, the other end of the rod 7 being connected to the steering rod 8 of a vehicle by a suitable knuckle joint 9. Formed on the posts 3 above the sockets 2 are tubular internally horizontally extending threaded arms 10, the arms normally projecting rearwardly of the machine. A screw 11 having an eye 12 at its outer end is threadedly engaged in each of the arms 10, and a connecting rod which comprises sections 13 and 14 are adapted for engagement with the eyes 12 at its opposite ends to connect the posts 3 together so that the same will be moved simultaneously upon the operation of the steering rod 13 of the vehicle. The section 13 of the connecting rod is formed with an offset apertured lug 15 at one end thereof, the aperture in the lug being adapted to register with the eye in the screw whereby the same may be connected by a suitable pin 16. The opposite end of the section 13 is adapted for threadable engagement in the section 14 which is tubular, the outer end of the section 14 being also provided with an offset apertured lug 17 for connection to the outer screw 11 on the opposite side of the vehicle.

The socket members 2 are provided with laterally extending apertured ears 19 for the reception of bolts, whereby the sockets are secured to the bed rails. The cylindrical sockets 2 are threaded at their upper and lower ends, as at 20 and 21, respectively. A bearing ball cup 22 is threadedly mounted in the upper end of each of the sockets, each of the cups having a central opening 23 therein around which an annular series of bearing balls 24 is arranged. Threadedly mounted in the lower end of each socket is a reversed cup 25 which is formed with a central opening 26 around which a series of bearing balls 27 is arranged, the openings 26 in the lower cups being disposed in vertical alinement with the openings 23 in the upper cups and being of relatively smaller diameter than the openings 23. Each post 3 is angular in cross section and reduced at its lower end as at 28, the post having an angular portion 29 intermediate of its ends forming a shoulder 30. Each of the posts 3 is threaded adjacent its upper end whereby a bearing cone 31 is adjustably connected thereto, and the lower end of the post is also threaded for the reception of a lower bearing cone 32.

In assembling my improved device, the sockets 2 containing the bearing ball cups are secured to the bed rails of the vehicle, and the posts 3 are mounted in the sockets so that the bearing cones 31 engage the bearing balls 24 contained in the upper bearing cups 22 of the sockets. Each of the cylinders is provided adjacent the upper face of the lower bearing cup 25 with an inwardly extending pin or hook 33, and a conical spring 34 is disposed in each of the sockets, the lower end of the spring being hooked, as at 35, for engagement with the inwardly extending pin 33, the upper end of this spring being formed with an angular portion 36 which is adapted to engage with the angular portion 29 of the post. The lower cups 25 are then threadedly connected in the lower ends of the sockets so that the lowermost convolutions of the springs 34 engage the upper faces of the cups. The lower cones 32 are then threadedly mounted on the lower ends of the posts to maintain the posts in position in the sockets and the arm 5 is connected to the lower extremity of one of the posts, the arm being connected to the steering rod 8 of the vehicle. The posts are then connected by the sectional connecting rod, to operate simultaneously with the operation of the steering rod 8, as heretofore described, and it will be seen that upon operation of the steering rod 8 to turn the wheels in either direction, the lamps will be also turned in the same direction with the wheels, to throw the beams of light in the path of the vehicle. As each of the springs 34 is connected at one end to one of the sockets and at its other end to the post mounted within the socket, it will be seen that the tension of the springs normally maintain the lamps in position to throw the beams of light forwardly of the vehicle should any of the connecting rods become loosened. The threaded rod 5 is mounted in an interiorly threaded sleeve 37 which is provided with a laterally disposed extension 38 having an opening 39 formed therein through which the lower end of the post 3 is passed. The sleeve 37 is prevented from rotating relatively to the post by means of a set screw 40 which is disposed through the extension 39 to frictionally engage the periphery of the post 3. It will be seen that by the provision of the threaded rod 5 and the sleeve 37, that the lamps may be adjusted to the throw of running gears upon different vehicles, so that the lamps will be turned to the same degree as the wheels of the vehicle.

Having thus fully described my invention, what I desire to secure and claim by Letters Patent, is:—

A device of the class described including a pair of revoluble lamp supports, a horizontal rod having its ends pivotally connected adjacent the upper ends of said supports, a sleeve arranged upon the lower end of each of the supporting posts and having angularly disposed extensions formed thereon, said extensions having a screw threaded opening, a threaded rod having an eye formed upon one end adjustably arranged within said opening, and a connecting rod having a hooked end, said connecting rod having its hooked end connected in said eye and the opposite end connected to the steering rod.

In testimony whereof I hereunto affix my signature in the presence of two witnesses.

GEORGE R. BAKER.

Witnesses:
W. N. STOKES,
S. A. L. MORGAN.